(12) United States Patent
Vinue Santolalla et al.

(10) Patent No.: US 8,489,259 B2
(45) Date of Patent: Jul. 16, 2013

(54) AIRCRAFT BLACK BOX

(75) Inventors: Eduardo Vinue Santolalla, Madrid (ES); Diego Folch Cortes, Madrid (ES); Esteban Martino Gonzalez, Madrid (ES); Enrique Guinaldo Fernandez, Salamanca (ES); Pablo Goya Abaurrea, Madrid (ES)

(73) Assignee: Airbus Operations S.L., Madrid (ES)

( * ) Notice: Subject to any disclaimer, the term of this patent is extended or adjusted under 35 U.S.C. 154(b) by 175 days.

(21) Appl. No.: 13/041,749

(22) Filed: Mar. 7, 2011

(65) Prior Publication Data

US 2012/0166037 A1   Jun. 28, 2012

(30) Foreign Application Priority Data

Dec. 22, 2010   (ES) .................................. 201031920

(51) Int. Cl.
*G06F 7/70* (2006.01)
*G06F 19/00* (2011.01)
*G06G 7/00* (2006.01)
*G06G 7/76* (2006.01)

(52) U.S. Cl.
USPC ............. 701/14; 244/1 R; 244/137.1; 455/96; 102/339; 102/348

(58) Field of Classification Search
USPC . 701/35, 14; 455/94, 95, 96, 97, 98; 102/339, 102/348; 244/1 R, 137.1
See application file for complete search history.

(56) References Cited

U.S. PATENT DOCUMENTS

| 2,328,208 | A | * | 8/1943 | Friedman | 244/1 R |
| 2,959,671 | A | * | 11/1960 | Stevinson | 455/96 |
| 3,140,847 | A | * | 7/1964 | Ames, Jr. | 244/138 R |

FOREIGN PATENT DOCUMENTS

| FR | 1 424 590 A | 1/1966 |
| FR | 1 455 601 A | 4/1966 |
| GB | 821 268 A | 10/1959 |

OTHER PUBLICATIONS

International Search Report mailed Jul. 10, 2012 in PCT/ES2011/070874 filed Dec. 16, 2011 (with English-language Translation).

* cited by examiner

*Primary Examiner* — John Q Nguyen
*Assistant Examiner* — James E Stroud
(74) *Attorney, Agent, or Firm* — Oblon, Spivak, McClelland, Maier & Neustadt, L.L.P.

(57) ABSTRACT

Commercial aircraft (11) having a black box (41) comprising a flight data recorder (49) connected to suitable acquisition units (13, 14, 15) for recording information required for crash investigation purposes inside a container (43), wherein the aircraft (11) comprises a crash detection device (17); the black box (41) is installed in a suitable location for being ejected outside the aircraft in a crash event through a duct (21, 31) having its exit in a fuselage area where the ejected black box (41) would not impact on the aircraft; the aircraft (11) also comprises ejection means (23, 33), controlled by a black box ejection control unit (19) connected to said crash detection device (17), for ejecting the black box (41) through said duct (21, 31), when an impending crash is detected by said crash detection device (17).

7 Claims, 2 Drawing Sheets

AIRCRAFT BLACK BOX

FIELD OF THE INVENTION

This invention refers to a black box installed in an aircraft and more in particular to a black box installed in a commercial aircraft.

BACKGROUND OF THE INVENTION

According to international rules, commercial aircrafts shall be provided with a unit generally known as a black box (although they are usually painted with a bright orange colour) having means for recording data regarding the aircraft for investigation purposes.

Black boxes record, on one side, aircraft performance parameters and, on the other side, conversations between the pilot, ground control, copilot and other flight crew, as well as in certain cases images taken by cameras. Black boxes store only the information corresponding to a predetermined last period of the flight, typically 30 minutes.

Black boxes shall be crash survivable and easy to locate containers so they are designed to withstand a crash and they usually have automatic beacons which begin transmitting a signal after a crash to enhance their recoverability. They are usually installed in the tail zone of the aircraft, which provides crash protection for a typical crash. While black boxes can be easily recovered in crash events on land, the same does not apply to crash events in the sea where apart from the problem of locating the crashed aircraft there is the problem of recovering the black box in deep waters.

In order to facilitate the recovery of black boxes it has been proposed, on one side, to eject the black box prior to the aircraft crash to avoid the difficulties found in the aircraft crash scenario for the recovery of the black box and, on the other side, to provide the black box with specific means for enabling its recovery such as, particularly, floating means for crash events on the sea.

However these proposals have not been implemented because they have certain drawbacks. For example, the proposal for the ejection of the black box prior to the crash using ejection mechanisms using explosive means raises security concerns.

The present invention is oriented towards solving said drawbacks.

SUMMARY OF THE INVENTION

An object of the present invention is to provide an aircraft with a black box that can be easily recovered in an aircraft crash.

Another object of the present invention is to provide an aircraft with a black box that can be safely ejected outside the aircraft in a crash.

These and other objects are met by a commercial aircraft having a black box comprising a flight data recorder connected to suitable acquisition units for recording information required for crash investigation purposes inside a container, and in which:

the aircraft comprises a crash detection device;
the black box is installed in a suitable location for being ejected outside the aircraft in a crash event through a duct having its exit in a fuselage area where the ejected black box would not impact on the aircraft;
the aircraft also comprises ejection means controlled by a black box ejection control unit connected to said crash detection device for ejecting the black box through said duct when an impending crash is detected by said crash detection device.

In a preferred embodiment the container has a rounded shape, which facilitates its ejection along tubular ducts.

In a preferred embodiment said duct is an exhaust duct of an aircraft air conditioning system located in the rear part of the aircraft, and has its exit in a fuselage area subjected to negative aerodynamic pressure; the black box is installed over a frangible area of said exhaust duct; and the ejection means are suitable means for breaking or displacing said frangible area to allow the black box to fall into the exhaust duct. Thus an aircraft with a black box that can be easily ejected outside of the aircraft is achieved.

In another preferred embodiment said duct is an ad-hoc duct having inlet and outlet ways from/to the aircraft surface and doors for opening/closing said inlet and outlet ways; the black box is installed within said duct; and said ejection means are suitable means for opening simultaneously said doors. Thus an aircraft with a black box with a specific location which facilitates its ejection outside the aircraft without using mechanical or chemical propulsion means is achieved.

In preferred embodiments the black box also comprises a location transmitting device using, preferably, a fuel cell as a source of energy and/or inflatable means and/or a parachute which are activated by said black box ejection control unit when an impending crash is detected by said crash detection device.

Other characteristics and advantages of the present invention will be clear from the following detailed description of embodiments illustrative of its object in relation to the attached figures.

DETAILED DESCRIPTION OF THE INVENTION

Figure 1:
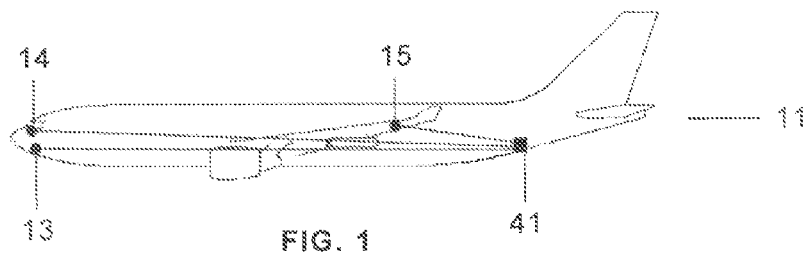
FIG. 1 is schematic view of the installation of a black box in a commercial aircraft.

FIG. 1 shows a black box 41 located in the rear zone of an aircraft 11 connected to data acquisition units 13, 14, 15 located in different areas of the aircraft and connected to the data sensors, sound sensor and/or image sensors needed for the black box 4 to record the information required for crash investigation purposes.

Figure 2:
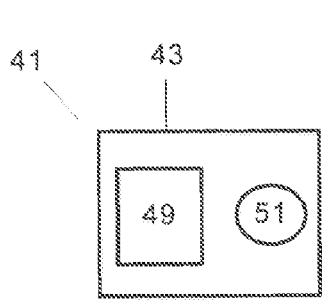
FIG. 2 is a block diagram of a known black box.

A typical black box 41 comprises (see FIG. 2):
A parallelepiped-shaped container 44.
A flight data recorder 49, which is the black box component connected to the data acquisition units 13, 14, 15.

A location transmitting device 51 including a switch device for its activation when the aircraft crash happens.

Figure 3:
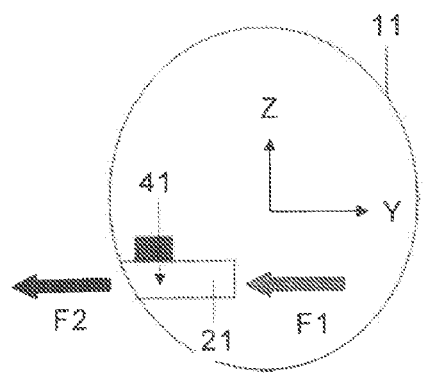
FIGS. 3 and 4 are, respectively, frontal and side schematic views of a black box installed in an aircraft according to a first embodiment of the present invention.
Figure 4:
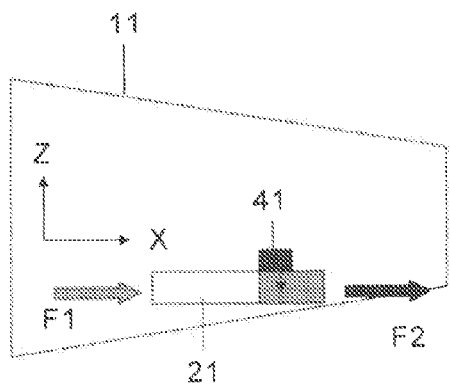
Figure 5:
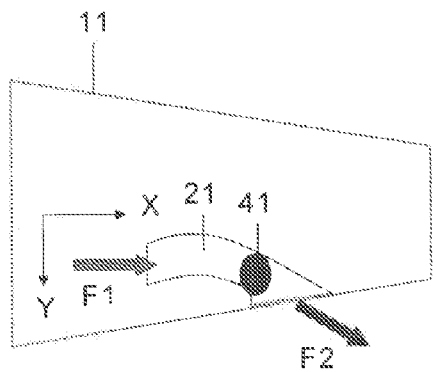
FIG. 5 is a schematic side view of the ejection of a black box according to a preferred embodiment of the present invention.
Figure 7:
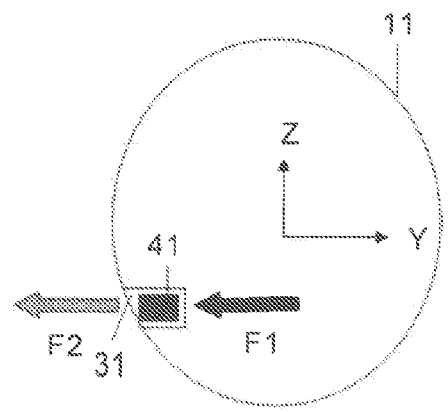
FIGS. 7 and 8 are, respectively, frontal and side schematic views of a black box installed in an aircraft according to a second embodiment of the present invention.
Figure 8:
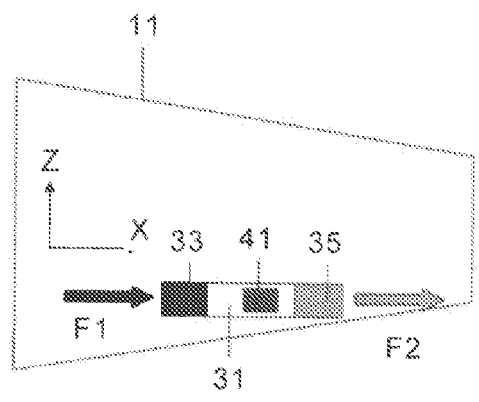
Figure 9:
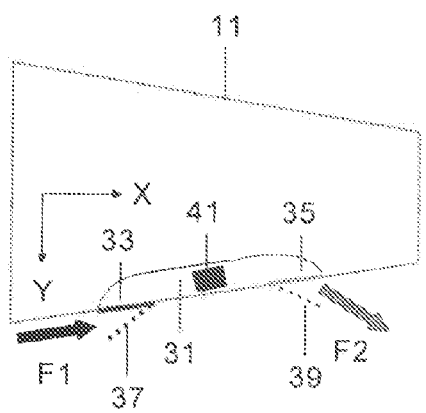
FIG. 9 is a schematic side view of the ejection of a black box according to a second embodiment of the present invention.
Figure 10:
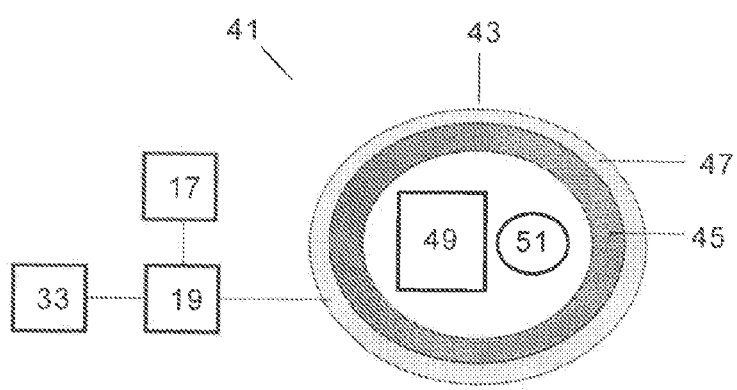
FIG. 10 is a block diagram of a black box according to a second embodiment of the present invention.

In a preferred embodiment of the present invention illustrated in FIGS. 3, 4 and 5 the black box 41 is installed inside the aircraft 11 over a frangible area of an exhaust duct 21 (typically a tubular duct) for evacuating exhaust gases in the direction indicated by arrow F1 located in the rear part of the aircraft fuselage so that in the event of a crash the black box 41 can be ejected through the exhaust duct 21 following the direction indicated by arrow F2.

Commercial aircrafts have exhaust ducts in the rear part of the fuselage such as:

Air Conditioning and pressurization (ATA21) exhaust ducts, proceeding from the air conditioning distribution system, from the cabin pressure control system (e.g. through the out flow valve) and from the Environmental Control System packs, which are air cycle refrigeration systems that use the air passing through and into the aircraft as the refrigerant.

Pneumatic (ATA36) exhaust ducts proceeding from the pre-cooler units in the case of aircrafts with engines placed on the rear end of the aircraft.

These exhaust ducts are suitable ejection channels for the black box 41 because:

their exit is located in an aircraft aerodynamic area with negative pressure where a suction effect takes place to facilitate the evacuation of exhaust gases;

their exit is located in an aircraft area where the risk that the ejected black box can impact on the aircraft is minimum;

the exhaust flow contributes to the ejection of the black box.

Figure 6:
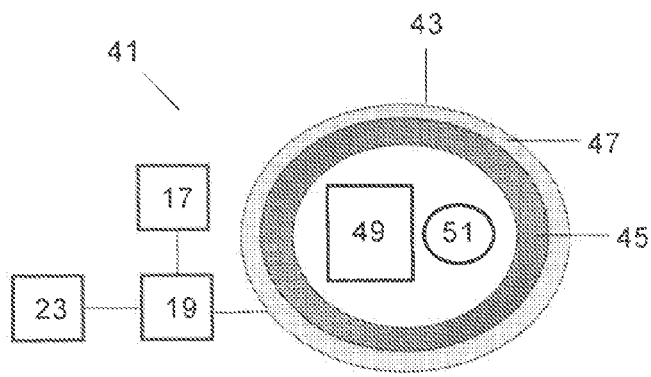
FIG. 6 is a block diagram of a black box according to another preferred embodiment of the present invention.

The black box 41 according to a preferred embodiment of this invention (see FIG. 6) comprises at least a rounded-shaped container 43 such as an spherical container or an oval container for facilitating its ejection by a tubular duct, a flight data recorder 49 and a location transmitting device 51 including a switch device for its activation when the aircraft crash happens. Additionally, in preferred embodiments, it can comprise inflatable means 45 into the container 43,44 connected to a source of compressed gas which are designed as a black box floating means and/or as a black box impact resistant means and a parachute 47 into the container 43,44 designed as a black box impact resistant means.

When an impending crash is detected by a suitable crash detection device 17, including within the meaning of this invention mechanical means such an accelerometer and/or pilot orders advising an impending crash, a black box ejection control unit 19 activates, on one hand, an ejection means 23 that breaks or displaces the frangible area of the exhaust duct 21 to allow that the black box 41 falls into the exhaust duct 21, and on the other hand activates the location transmitting device 51 and, with a predetermined delay with respect to the activation of the ejection means 23, the inflatable means 45 and the parachute 47, if present, so that they can initiate its deployment.

In a second embodiment of the present invention illustrated in FIGS. 7, 8, 9 and 10 the black box 41, having the same elements than in the first embodiment, is installed inside the aircraft 11 within an ad-hoc duct 31 located in an aircraft area where the risk that the ejected black box can impact on the aircraft is minimum to facilitate its ejection.

The duct 31 has inlet and outlet ways 33, 35 with doors 37, 39 so that in the event of a crash detected by the detecting means 17 the ejection control unit 19 activates the ejection means 33 that open simultaneously said doors 37, 39 so that an external airflow can enter into the duct 31 by the inlet way 33 as indicated by arrow F1 causing an impact on the black box 41 due to dynamic pressure inside the duct 31 forcing it to be ejected outside of the aircraft through the outlet way 35 following the direction indicated by arrow F2.

As in the above-mentioned embodiment, the activation of the ejection means triggers the activation of the location transmitting device 51 as well as the inflatable means 45 and/or the parachute 47, if present, so that they can initiate its deployment.

Therefore this invention among other advantages improves prior art systems using explosive means or complex devices for the black box ejection.

Although the present invention has been fully described in connection with preferred embodiments, it is evident that modifications may be introduced within the scope thereof, not considering this as limited by these embodiments, but by the contents of the following claims.

The invention claimed is:

1. A commercial aircraft having a black box comprising a flight data recorder connected to suitable acquisition units for recording information required for crash investigation purposes inside a container, wherein:

the aircraft comprises a crash detection device;

the black box is installed in a suitable location for being ejected outside the aircraft in a crash event through a duct having its exit in a fuselage area where the ejected black box would not impact on the aircraft;

the aircraft also comprises ejection means, controlled by a black box ejection control unit connected to said crash detection device, for ejecting the black box through said duct, when an impending crash is detected by said crash detection device; said duct is an exhaust duct of an aircraft air conditioning system located in the rear part of the commercial aircraft and having its exit in the fuselage area subjected to negative aerodynamic pressure on the duct exit; the black box is installed over a frangible area of said exhaust duct; and said ejection means are suitable for breaking or displacing said frangible area to allow that the black box falls into the exhaust duct.

2. The commercial aircraft according to claim 1, wherein the container is a rounded-shaped container or a parallelepiped-shaped container.

3. The commercial aircraft according to any of claims 1-2, wherein:

said duct is an ad-hoc duct having inlet and outlet ways from/to the aircraft surface and doors for opening/closing said inlet and outlet ways;

the black box is installed within said duct;

said ejection means are suitable means for opening simultaneously said doors.

4. The commercial aircraft according to any of claim 1, wherein the black box also comprises a location transmitting device including a switch device controlled by said black box ejection control unit for its activation when an impending crash is detected.

5. The commercial aircraft according to claim 4, wherein the source of energy of said location transmitting device is a fuel cell.

6. The commercial aircraft according to any of claim 1, wherein said container includes inflatable means controlled by said black box ejection control unit so that they can be activated with a predetermined time delay after the detection of an impending crash.

7. The commercial aircraft according to any of claim 1, wherein said container includes a parachute controlled by said black box ejection control unit so that it can be activated with a predetermined time delay after the detection of an impending crash.

* * * * *